(No Model.) 3 Sheets—Sheet 1.

J. TAYLOR.
SAW SETTING AND FILING MACHINE.

No. 444,163. Patented Jan. 6, 1891.

WITNESSES:
L. D. Little
A. C. Johnson

INVENTOR:
James Taylor
BY Higdon & Higdon
ATTORNEYS.

(No Model.) 3 Sheets—Sheet 2.

J. TAYLOR.
SAW SETTING AND FILING MACHINE.

No. 444,163. Patented Jan. 6, 1891.

WITNESSES:
L. D. Little
A. C. Johnson

INVENTOR:
James Taylor
BY Higdon & Higdon
ATTORNEYS.

THE NORRIS PETERS CO., PHOTO-LITHO., WASHINGTON, D. C.

(No Model.) 3 Sheets—Sheet 3.

J. TAYLOR.
SAW SETTING AND FILING MACHINE.

No. 444,163. Patented Jan. 6, 1891.

WITNESSES:
L. D. Little
A. C. Johnson

INVENTOR:
James Taylor
BY Higdon & Higdon
ATTORNEYS.

UNITED STATES PATENT OFFICE.

JAMES TAYLOR, OF BEAVER FALLS, PENNSYLVANIA.

SAW SETTING AND FILING MACHINE.

SPECIFICATION forming part of Letters Patent No. 444,163, dated January 6, 1891.

Application filed March 29, 1890. Serial No. 345,827. (No model.)

*To all whom it may concern:*

Be it known that I, JAMES TAYLOR, a citizen of the United States, residing at Beaver Falls, in the county of Beaver and State of Pennsylvania, have invented certain new and useful Improvements in Saw Setting and Filing Machines; and I do hereby declare that the following is a full, clear, and exact description of the invention, such as will enable others skilled in the art to which it appertains to make and use the same, reference being had to the accompanying drawings, which form a part of this specification.

My invention has relation to a combined saw setting and filing machine; and it has for its objects, first, to set either one or both sides of the saw without bending, sweeping, or twisting the blade; further, to set the teeth of a saw without reducing the thickness thereof, as will result if they are struck by a hammer; further, to provide means for lifting the file from the saw without injuring the teeth or otherwise spoiling the work just completed; further, to provide a simple adjustable means for feeding the saw, whereby any sized tooth may be accommodated; further, to provide a filing mechanism which is guided positively and does not depend upon the previous shape of the tooth, thereby enabling a saw which has before been irregularly filed to be perfectly filed; further, to provide a simple and adjustable means for setting, which may be arranged to correspond exactly with the filing mechanism, whereby the setting and filing of the same saw are accomplished simultaneously; further, to provide means for adjusting the file, whereby it may be caused to attack the tooth in any preferred manner, and, further, to simplify and improve the various parts of the device, so as to produce the best results with the fewest number of moving parts.

Figure 3:
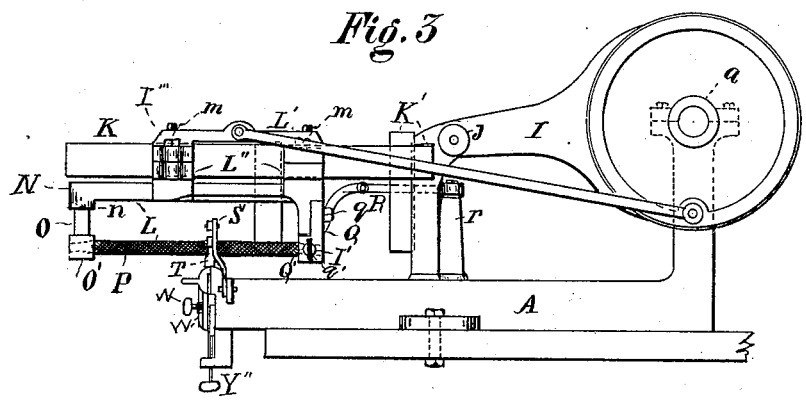
Figure 1:
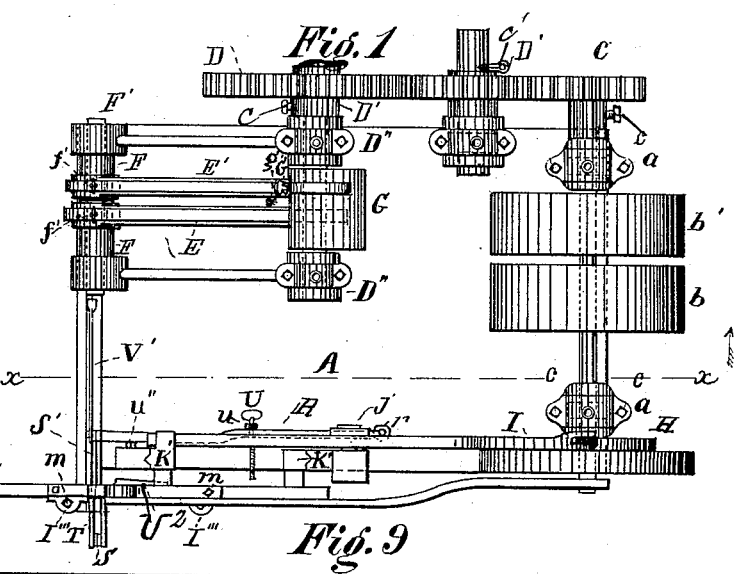
Figure 9:
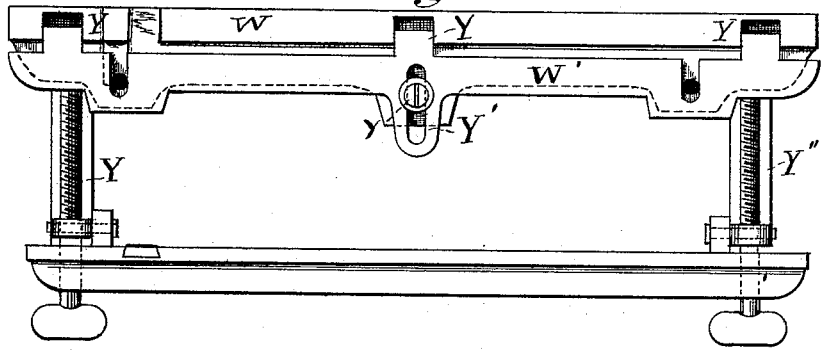
Figure 2:
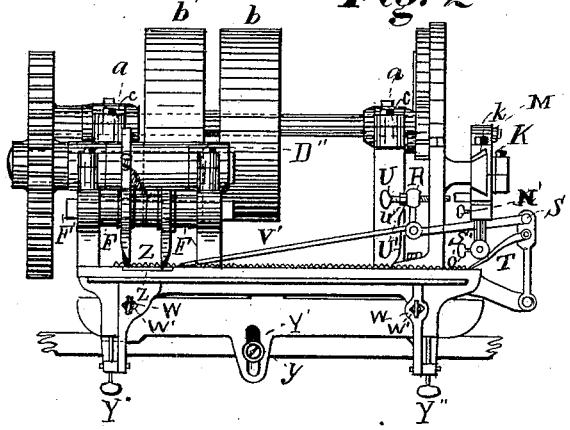
Figure 7:
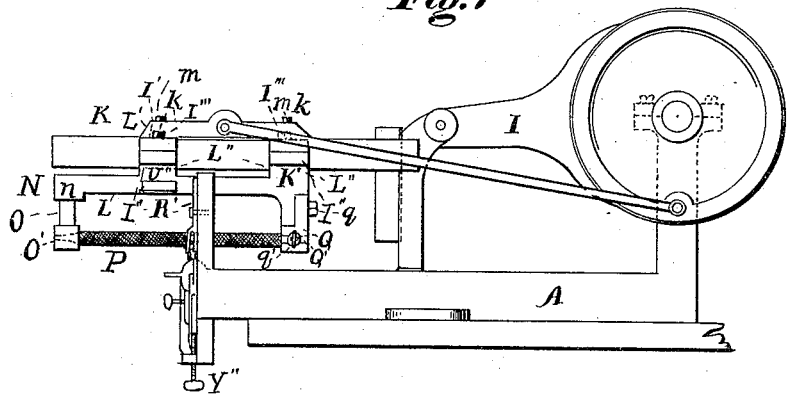
Figure 8:
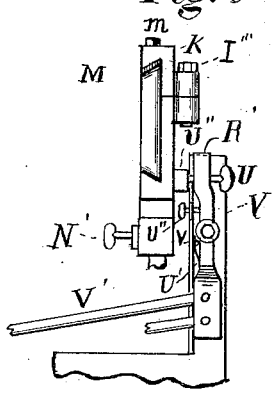
Figure 10:
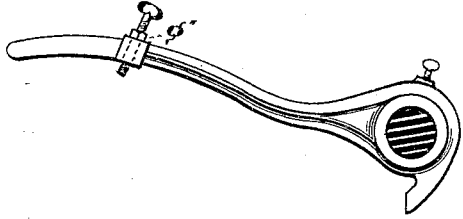
Figure 4:
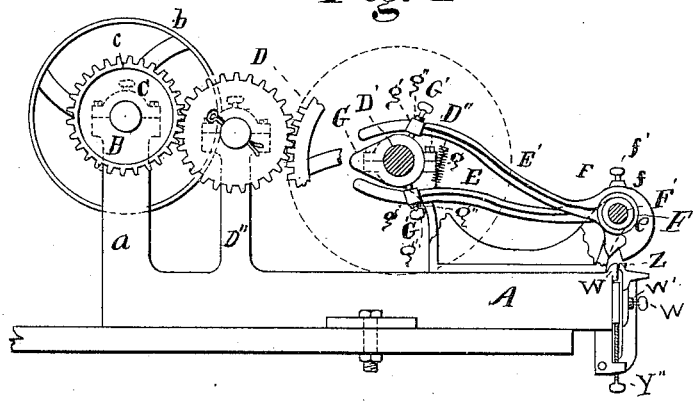
Figure 5:
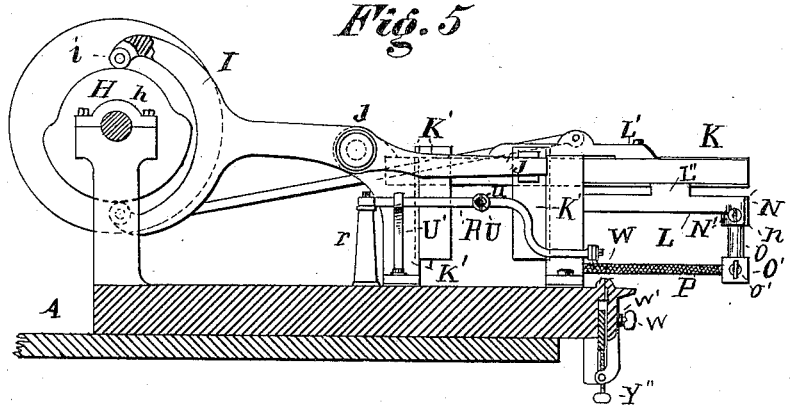
Figure 6:
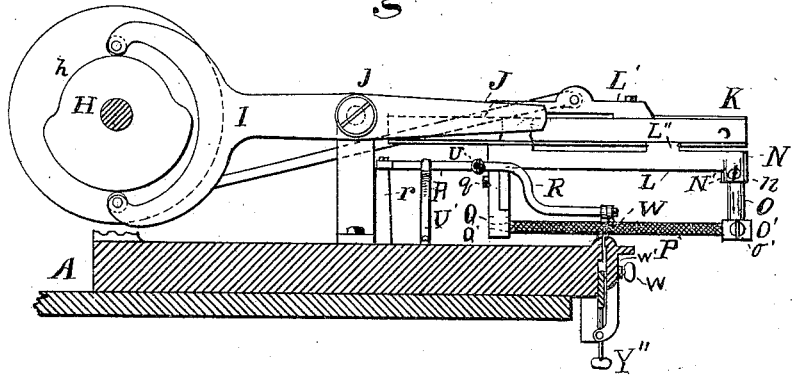

Referring to the drawings, Figure 1 is a plan view of a machine embodying my invention. Fig. 2 is a front view of the same. Fig. 3 is a side view looking in the direction indicated by the arrow in Fig. 1. Fig. 4 is a similar view looking at the opposite side. Fig. 5 is a sectional view taken on the line $x\,x$ of Fig. 1. Fig. 6 is a similar view showing a modified and simplified form of yoke for operating the file-carriage guide-bar. Fig. 7 is a partial side view similar to Fig. 3, showing a modified and simplified form of feed mechanism. Fig. 8 is a detail view of the same. Fig. 9 is a partial front view to show the construction of the vise. Fig. 10 is a detail view of one of the setting-levers.

A represents the bed-plate of the machine, and in bearings at the upper ends of standards $a\,a$ on said bed-plate is mounted the driving-shaft B, which carries the driving-pulley $b$ and the idler-pulley $b'$. To one end of this shaft is secured a pinion C, which meshes with an idler-pinion C′, which in turn meshes with a gear-wheel D, which is secured to a shaft D′, mounted in bearings D″. The gear-wheel D and pinion C are preferably locked upon their shafts by means of bolts $c\,c$, and the idler-pinion is secured to its shaft by means of a pin $c'$, whereby the idler-pinion may be drawn out of engagement with said gear-wheel and pinion to throw the setting device out of gear.

The setting-levers E′ E are provided, respectively, with die-holding heads $e\,e$, in which are formed eyes $f$, which embrace and fit snugly upon the sleeves F F, which are mounted upon a transverse shaft F′, and are adapted to rotate freely thereon. The heads of the setting-levers are locked firmly to the revoluble sleeves F by means of thumb-screws $f'$. The free rear ends of the setting-levers extend, respectively, above and below the shaft D′, said shaft being provided between its bearings D″ D″ with a cam-block G, which, when the machine is in operation, alternately raises and depresses the free ends of the setting-levers, respectively. The free ends of the setting-levers are held in contact with the cam-block by means of a tension-spring (preferably coiled spring) $g$, and set-screws G′ G′ are fitted in threaded openings $g'$ in said levers to bear at their inner ends upon the surface of the cam-block. The set-screws are preferably in the form of thumb-screws, and are provided with jamb-nuts $g''$. To increase the throw of the jaws of the setting-levers, the set-screws are screwed inward or toward the cam-block, and if it is desired to set only one side of the saw it may be accomplished by loosening or withdrawing one of the set-screws until the inner face of the lever bears upon the surface of the cam-block. The combined widths of the revoluble sleeves upon which the heads or jaws of the setting-levers are fixed are equal to the distance between the teeth of the coarsest saw in use, and the cam-block is of a corresponding width, so as to bear against and operate the levers in any adjustment. The opposite end of the driving-shaft carries a cam-disk H, upon the cam-shoulder $h$ of which operates the yoke I of the lifting-arm J, which is fulcrumed at the point $j$.

The guide-frame consists of a guide bar or track K, which is preferably dovetailed in shape, and the vertical slides $k\ k$, which fit between and are guided by the grooved standards K' K'. These slides are secured rigidly to the side of the guide bar or track, and their outer edges are tapered or V-shaped to fit in the V-shaped grooves of the standards. The free end of the lifting-arm fits between lateral ears on one of the slides, whereby the guide-frame is vertically reciprocated as the lifting-arm is oscillated.

The file-carriage L is connected by a rod or pitman $l$ to the cam-disk, said carriage consisting of an upper member L', which bears on the upper side of the guide bar or track, and a lower member L'', which bears on the under side of the same. The upper and lower members of the carriage are provided with lateral perforated ears $l'\ l'$, which are connected together by the bolts $l''$. The upper member of the carriage is provided on its under surface, or the surface which rides on the upper side of the guide bar or track, with a soft-metal wear-plate M, which is held in contact with the guide-bar and adjusted to take up lost motion by the adjusting bolts or screws $m\ m$. The lower member of the carriage is provided at its front end with an arm N, having a sleeve $n$ at its extremity, in which fits the vertical stem of the file-holder O, said stem being held in place in the sleeve by an adjusting-screw N'. The reduced end of the file P fits in the socket O' of the holder and is secured in place by the adjusting-screw $o'$. It will be seen that the stem $o$ may be raised or lowered in the sleeve $n$ to elevate or depress the front end of the file. To the rear end of the lower member of the carriage is pivoted a swinging or adjustable file-holder Q for the rear end of the file, said holder being provided with a socket Q', having an adjusting-screw $q'$. The swinging holder is fulcrumed to a depending arm of the lower member of the carriage by means of an adjusting-bolt $q$, which, when tightened, locks the swinging holder in the desired position. The object of this swinging holder for the rear end of the file is to enable the latter to be so adjusted that the heel or rear end of the file will cut toward the tooth which is being filed, the pressure of the file upon said tooth being in this way increased as the carriage advances.

The file is reduced in thickness for a considerable distance in advance of the swinging holder, and in operation the file is drawn by the carriage until said reduced portion $p$ of the file is over the saw-blade, after which the lifting-arm operates to lift the file vertically, after which the latter is drawn back to its initial position. This is accomplished by arranging the offsets of the cam on the quarter-circle of the cam-disk, whereby the lifting-arm is operated only at the extremity of each stroke of the carriage.

In the modification of my lifting-bar which I have shown in Fig. 6 the free end thereof is aligned with its fulcrum and the center of the cam-disk, said free end being attached rigidly to the lifting-frame. By this means I do away with the sliding joint between the free end of the lifting-arm and the lifting-frame, thereby reducing the friction of the machine in operation. In this arrangement the guide bar or track is horizontal or parallel with the bed-plate while the carriage is advancing, and when the carriage reaches the end of its forward stroke the lifting-frame is raised, as in the other form; but the guide bar or track is now inclined downwardly toward its rear end, owing to the fact that the entire guide-frame swings about the fulcrum $j$. The advantage gained by this construction is simplicity, the number of working parts being reduced.

The feed mechanism consists of a pivoted arm R, which is mounted at its rear end upon a post $r$ and is connected at its front end to the upper end of a false arm S by a connecting-rod S', the feeding-finger T being pivoted loosely to the said false arm. The swinging arm R carries an adjusting-screw U, having a jam-nut $u$, and the carriage is provided with a beveled cam $u''$ to strike said adjusting-screw on the return or backward movement of the carriage and operate the swinging arm against the pressure of the spring U'. When the free end of the swinging arm is forced outward or from the carriage by the action of the beveled cam U'', the feeding-finger is drawn in the same direction, thereby advancing the saw-blade the distance of one tooth. By adjusting the screw U the throw of the feeding-finger may be varied to suit the size of the teeth on the saw. $u''$ represents a small stop-screw which is arranged in one of the grooved standards to limit the return movement of the swinging arm.

In the modification of the feed mechanism which is shown in Fig. 7 and in detail in Fig. 8, the swinging arm R', which corresponds with the swinging arm R of the other form just described, is arranged vertically instead of horizontally, the beveled cam U'' is arranged on the outer instead of the inner side of the carriage, the false arm S is omitted, and the feeding-finger is pivoted directly to the swinging arm. In this form of feeding mechanism an adjusting-screw U, similar to that already described, is arranged at the upper end of the swinging arm, and the stop-screw $u''$ is arranged in a flange $v$ on the standard V, to which the swinging arm is fulcrumed. Thus by the construction just described I attain much greater simplicity and accomplish the same result as with the other form with a fewer number of working parts, thereby reducing the friction in the machine. A further advantage of this construction is that the adjustment of the throw of the feeding-finger may be accomplished more easily, owing to the fact that the adjusting-screw is arranged on the outer instead of on the inner side of the carriage.

V' represents a supplementary feeding-finger, which, in the form of the feeding device which is shown in Figs. 1, 2, 3, and 9, is connected to the free end of the swinging arm R, and in Fig. 8 is shown connected to the swinging arm H' just above the finger T. The function of this supplementary feeding-finger is to continue the feeding of the saw-blade after it leaves the filing mechanism and while it is yet being operated upon by the setting-levers.

The vise which is employed to hold and guide the saw-blade while it is being acted upon by the filing and setting mechanisms consists of a stationary jaw W, which is formed on the front of the bed-plate, and a swinging jaw which is pivoted to said stationary jaw and is held in the position shown in Fig. 2 by means of retaining-bolts $w\ w$, which are provided with jam-nuts $w'$. The face of the stationary jaw is channeled or cut away to receive an adjustable guide-plate W', which is provided on its upper edge with vertical projections or rests Y, upon which the back of the saw-blade bears while passing through the machine. This guide-plate is provided with a vertical slot Y', through which passes a guide-screw $y$, which engages the stationary jaw of the vise, and under the ends of the guide-plate are arranged set-screws Y'' to enable the plate to be arranged so as to properly guide the saw-blade through the machine.

The setting-lever E, which passes at its free end over the cam-block, and whose jaw therefore presses toward the bed-plate when in operation, acts against a steel block Z, which is dovetailed into the stationary jaw of the vise, and the jaw of the other setting-lever acts against a similar block which is dovetailed into the inner surface of the swinging jaw of the vise.

My improved setting and filing machine, as above described, is designed for use on hand-saws, band-saws, clipper-saws, crosscut-saws, and any other kind which may be passed through a straight feeding-groove or vise, and its operation is as follows: The movement of the driving-shaft is communicated through the combination of gear-wheels to the rotary cam-block, which is provided on one side only with an offset, whereby only one of the setting-levers is operated at one time. Thus during one revolution of the cam-block the free end of the setting-lever E is raised, thereby drawing its jaw to the rear or toward the stationary jaw of the vise, and the free end of the lever E' is depressed, thereby throwing its jaw forward or toward the swinging jaw of the vise. Each revolution of the driving-shaft causes the file-carriage to advance and recede, thus completing one stroke, the feeding mechanism advancing the saw-blade the distance of one tooth during the return or backward movement of the carriage; but the pinion which is secured to the driving-shaft is in size to the gear-wheel D as one to two, thereby causing the cam-block to make one revolution while the driving-shaft makes two revolutions. Thus the cam-block makes one revolution and operates each of the setting-levers once while the carriage is making two complete strokes.

The operation of the setting-levers is to press gently and firmly against the side of the tooth, and as the saw-blade is inserted in the vise so that the bases of the teeth are flush with the upper edges of the jaws of the vise all bending, sweeping, or twisting of the blade is prevented. I have found that the blow of a hammer in setting the teeth of a saw thins the tooth at its point, and therefore detracts from its effectiveness and causes it to wear out more rapidly. By adjusting the screws at the free ends of the setting-levers the set of the teeth may be varied to suit the character of the saw, and if it is desired to set only one side of the saw one of the adjusting-screws may be loosened sufficiently to prevent the jaw of the lever from coming in contact with the teeth. If it is desired to throw the setting mechanism out of gear, it may be accomplished by withdrawing the pin from the idler-pinion and removing the latter from its position between the gear-wheel and the pinion on the driving-shaft.

The method which I have described of lifting the file from the teeth of the saw obviates the danger of tearing off the point of the tooth, which is liable to be done when the file is lifted by a side swing. In my machine the carriage completes its forward or filing movement, thereby removing the file from the saw, after which the file is raised vertically and is then drawn back to its former position, the feeding being accomplished during the backward movement of the carriage. It will be observed that the feeding mechanism is operated directly by the carriage, as, during the forward movement of the carriage, the beveled cam passes beneath the adjusting-screw of the swinging arm of the feed, and during the backward movement said cam-block strikes the adjusting-screw and operates the swinging arm.

In the simplified form of the feeding mechanism which I have described, the same principle of construction and operation is employed as in the other form, the advantage being that the feeding-finger is connected directly to the swinging arm, thereby obviating the necessity of a false arm and connecting-rod.

The object in providing a swinging holder for the rear end of the file is to enable the latter to be arranged either parallel with the movement of the carriage or slightly inclined inward or toward the tooth which is being filed at its rear end, in order to increase the pressure of the file upon the tooth as the file advances.

The distance between the upper ends of the projections or rests of the guide-plate and the upper edges of the jaws of the vise must correspond exactly with the distance from the back of the saw-blade to the base of its teeth, and the space between the opposing faces of the jaws is adjusted to fit the said blade, so that the pressure of the setting-levers will not cause any lateral movement of the blade. It will be seen that the lateral pressure of the setting-levers will bend the teeth in the desired direction without bending or twisting the blade, and as the said pressure upon the teeth is gradual the latter will not be thinned, as when a hammer-set is used.

The ends of the arms of the yoke are provided with small anti-friction rollers to bear on the surface of the cam to reduce the friction.

Having thus described my invention, what I claim, and desire to secure by Letters Patent of the United States, is—

1. The combination, with a guide bar or track and a sliding file-carriage mounted thereon, of a pivoted lifting-arm connected to said guide-bar or carriage and provided with a yoke I, and a cam-disk to operate said yoke and connected by a pitman to the file-carriage, substantially as described.

2. The combination, with a vertically-movable guide bar or track, of a file-carriage mounted on the same and consisting of two separable members secured together by bolts *l'''*, substantially as described.

3. The combination, with a guide bar or track dovetailed in cross-section, of a sliding file-carriage consisting of separable upper and lower sections, and wear-plates on the bearing-surface of the upper section, connected to adjusting-screws, substantially as described.

4. The combination, with a sliding file-carriage, of a vertically-adjustable file-socket attached to the front of the carriage, and a swinging or laterally-adjustable file-socket for the rear end of the file, substantially as described.

5. The combination, with a sliding file-carriage having a vertical sleeve *n* at its front end, the front file-holder provided with a stem to fit in said sleeve and vertically adjustable therein, and a laterally-adjustable rear file-holder pivoted to the carriage and provided with an adjusting-bolt, substantially as described.

6. The combination, with a vertically-movable guide bar or track and a sliding carriage mounted thereon and carrying the file, of a pivoted lifting-arm connected at one end to the guide bar or track and provided at the other end with a yoke, the cam-disk carrying a cam-shoulder which operates within said yoke and is provided on opposite sides with offsets to engage the arms of the yoke, and a pitman connected to the file-carriage and pivoted to the cam-disk on the quarter-circle, whereby the guide bar or track is elevated and depressed at the ends of the forward and backward movements of the carriage, substantially as described.

7. The combination of a guide bar or track provided with vertical slides mounted in grooved standards, the file-carriage mounted on said guide bar or track, and a pivoted lifting-arm connected by a sliding joint with the guide bar or track, substantially as described.

8. The combination, with a reciprocating file-carriage carrying a beveled cam-block, of a swinging arm carrying a feeding-finger and adapted to be operated by the cam-block, substantially as described.

9. The combination, with a reciprocating file-carriage, of a swinging arm carrying a feeding-finger and adapted to be operated by a beveled block fixed to the carriage, and a spring to return said arm to its normal position, substantially as described.

10. The combination, with a reciprocating file-carriage carrying a beveled cam, of a swinging arm carrying the feeding-finger, and an adjustable screw mounted in said arm and adapted to be engaged by said cam, substantially as described.

11. The combination, with a reciprocating file-carriage, of a swinging arm carrying an adjustable screw to be engaged by a cam on said carriage, and a false lever having the feeding-finger pivoted thereto and connected at its free end to the swinging arm, substantially as described.

12. The combination, with a reciprocating file-carriage carrying a cam, of a spring-actuated swinging arm having a feeding-finger connected thereto and provided with an adjustable screw to be engaged by the cam on the carriage, and an adjustable stop-screw to limit the return movement of the swinging arm, substantially as described.

13. The combination, with a rotary cam, of the setting-levers provided with opposing die-holding jaws, the rotary sleeves mounted on a stationary shaft and fitting in eyes or openings in the jaws of the setting-levers, and set-screws to lock the latter to the said sleeves, substantially as described.

14. The combination, with a driving-shaft and a reciprocating file-carriage connected by a pitman to a disk on said shaft, of a rotary cam-block geared to the said driving-shaft and setting-levers arranged at their free ends on opposite sides of said cam-block, substantially as described.

15. The combination, with the setting mechanism and the reciprocating file-carriage, of a feeding mechanism having a swinging arm operated by said carriage, the feeding-finger T, connected to said swinging arm, and the supplementary feeding-finger connected to said swinging arm to carry the saw-blade through the setting mechanism, substantially as described.

In testimony whereof I affix my signature in presence of two witnesses.

JAMES TAYLOR.

Witnesses:
J. F. MERRIMAN,
JOHN REEVES.